(12) United States Patent
Chung

(10) Patent No.: US 8,036,477 B2
(45) Date of Patent: Oct. 11, 2011

(54) IMAGE DECODER AND MOBILE DEVICE INCLUDING THE SAME

(75) Inventor: Dong-Ook Chung, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 905 days.

(21) Appl. No.: 12/033,049

(22) Filed: Feb. 19, 2008

(65) Prior Publication Data

US 2008/0205777 A1 Aug. 28, 2008

(30) Foreign Application Priority Data

Feb. 23, 2007 (KR) .......................... 10-2007-0018623

(51) Int. Cl.
*G06K 9/36* (2006.01)
*G06K 9/46* (2006.01)

(52) U.S. Cl. ........................................................ 382/233

(58) Field of Classification Search .................. 382/162, 382/164, 167, 173, 232, 233, 235, 250, 276, 382/277, 298, 305; 345/157–158, 589–591, 345/600–604, 670; 348/445, 556, 564, 580, 348/E5.102, E5.111; 375/240.02; 358/515, 358/518

See application file for complete search history.

(56) References Cited

U.S. PATENT DOCUMENTS

| | | | |
|---|---|---|---|
| 4,602,285 A * | 7/1986 | Beaulier et al. | 348/580 |
| 5,619,226 A * | 4/1997 | Cahill, III | 345/667 |
| 5,798,719 A * | 8/1998 | Wise et al. | 341/67 |
| 5,872,866 A * | 2/1999 | Strongin et al. | 382/233 |
| 5,912,710 A * | 6/1999 | Fujimoto | 348/445 |
| 5,982,935 A * | 11/1999 | Arbel | 382/233 |
| 6,377,242 B1 * | 4/2002 | Sweed | 345/158 |
| 2006/0061687 A1* | 3/2006 | Dunton | 348/564 |
| 2006/0147122 A1* | 7/2006 | Srinidhi | 382/235 |
| 2007/0294245 A1* | 12/2007 | van Baarsen et al. | 707/6 |
| 2008/0084927 A1* | 4/2008 | Rosenzweig et al. | 375/240.02 |
| 2008/0159654 A1* | 7/2008 | Tu et al. | 382/298 |
| 2008/0205777 A1* | 8/2008 | Chung | 382/233 |

* cited by examiner

*Primary Examiner* — Amir Alavi

(74) *Attorney, Agent, or Firm* — Volentine & Whitt, PLLC

(57) ABSTRACT

In one aspect, a mobile device is provided which includes a memory configured to store an original image and an output image, a display device configured to display the output image, and an image decoder. The image decoder is configured to receive the original image from the memory, to identify blocks included in the original image that are capable of being independently decoded, to generate the output image by pre-scaling each of the identified blocks on the basis of a size of a display image, and to store the generated output image in the memory.

19 Claims, 3 Drawing Sheets

IMAGE DECODER AND MOBILE DEVICE INCLUDING THE SAME

CROSS-REFERENCE TO RELATED APPLICATIONS

A claim of priority under 35 USC §119 is made to Korean Patent Application No. 2007-0018623, filed Feb. 23, 2007 in the Korean Intellectual Property Office (KIPO), the contents of which are incorporated herein in its entirety by reference.

BACKGROUND OF THE INVENTION

1. Field of the Invention

The present invention generally relates to image decoding, and more particularly, to a method of decoding an image, an image decoder, and a mobile device including an image decoder.

2. Description of the Related Art

Modern mobile communication devices, such as cellular telephones, are commonly equipped with multimedia functionality. Examples including the playing of movies such as moving picture expert group (MPEG) files, the display of images such as joint picture expert group (JPEG) files, and the playing of audio files such as MPEG Layer 3 (MP3) files.

In the case of image files, such as JPEG files, it may be necessary to convert an original image file into a file which is suitable for display on the relatively small-sized display screen of the mobile device.

FIG. 1 is a diagram illustrating a process executed in a conventional mobile device to decode an original JPEG image to allow for display of the JPEG image on the screen of a mobile device.

The mobile device initially converts the original JPEG image 110 into a YUV image 120, and stores the YUV image in a YUV buffer memory. Generally, the size of the YUV image may be about twice that of the JPEG image. For example, if the size of the JPEG original image 110 is about 1.3 Megabytes, the size of the converted YUV image 120 may be about 2.6 Megabytes.

The mobile device then converts the YUV image 120 into an RGB image 130 (most display devices cannot directly display YUV formatted image data) which is stored in an RGB image buffer memory. For example, if the size of the YUV image 120 is about 2.6 Megabytes, the size of the converted RGB image 130 may be about 1.3 Megabytes.

The mobile device resizes the RGB image 130 into a final RGB image 140 that is suitable for the display screen of the mobile device. In the case of a liquid crystal display (LCD), the final RGB image 140 is stored in an LCD buffer memory. For example, the size of a final RGB image 140 suitable for display on the display device of the mobile device may be about 2.8 Kilobytes. In that case, an RGB image 130 of about 1.3 Megabytes, for example, would be converted into a final RGB image 140 of about 2.8 Kilobytes.

As is apparent from the above, substantial memory resources (e.g., the high capacity YUV buffer memory) are required to convert the JPEG original image 110 into the final RGB image 140.

SUMMARY OF THE INVENTION

In some example embodiments of the present invention, an image decoder is provided which includes means for identifying blocks included in an original image capable of being independently decoded, and means for generating an output image by pre-scaling each of the identified blocks on the basis of a size of a display image.

In other example embodiments of the present invention, a mobile device is provided which includes a memory that stores an original image and an output image, a display device that displays the output image, and an image decoder. The image decoder is configured to receive the original image from the memory, to identify blocks included in the original image that are capable of being independently decoded, to generate the output image by pre-scaling each of the determined blocks on the basis of a size of a display image, and to store the generated output image in the memory.

BRIEF DESCRIPTION OF THE DRAWINGS

Various aspects and features of example embodiments of the present invention will become readily apparent from the description that follows, with reference to the accompanying drawings, in which.

DESCRIPTION OF THE EMBODIMENTS

Figure 1:
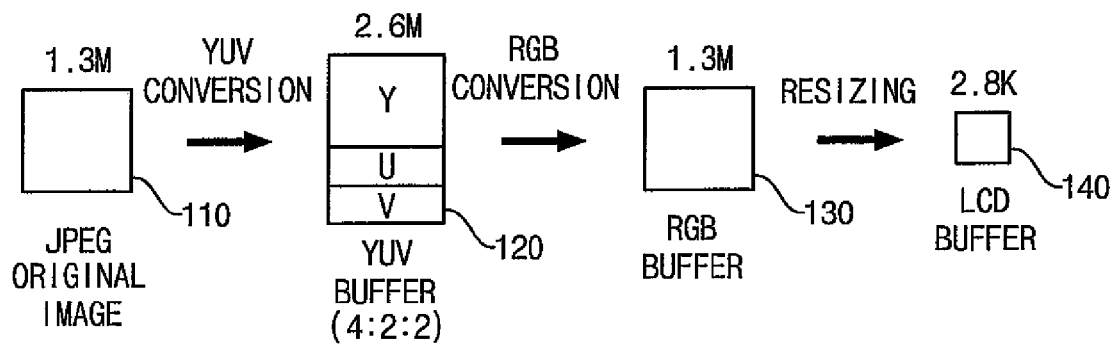
FIG. 1 is a diagram illustrating a process executed by a conventional mobile device when decoding an original JPEG image.

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an"

and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
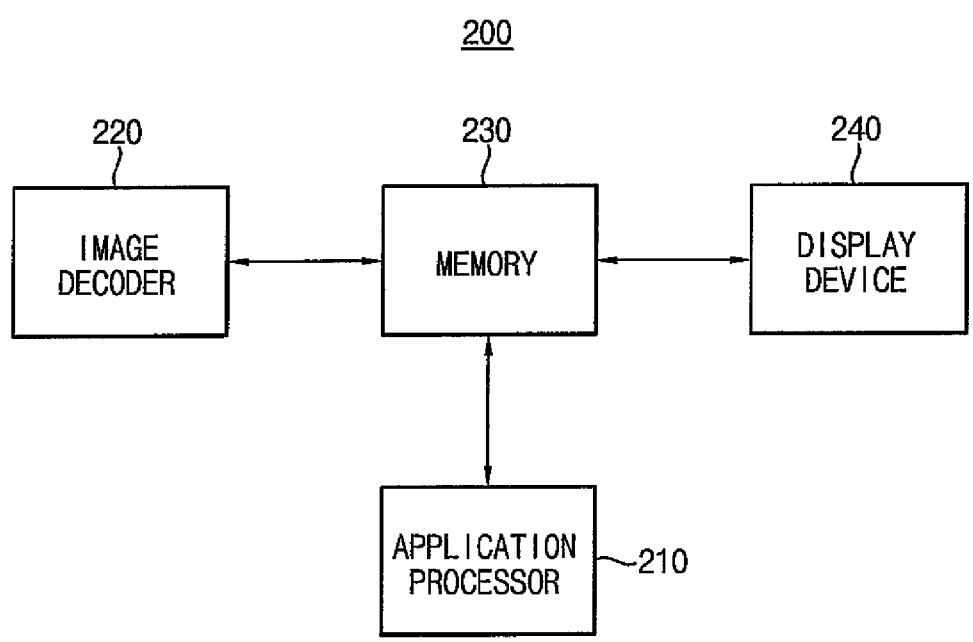
FIG. 2 is a block diagram illustrating a mobile device in accordance with an example embodiment of the present invention.

FIG. 2 is a block diagram illustrating a mobile device in accordance with an example embodiment of the present invention.

Referring to FIG. 2, the mobile device 200 of this example includes an application processor 210, an image decoder 220, a memory 230, and a display device 240.

The application processor 210 controls the image decoder 220, the memory 230, and the display device 240 during an image conversion process. For example, the application processor 210 may be physically implemented by an integrated circuit which is configured to control the image decoder 220, memory 230, and display device 240 as described herein.

As will be explained in more detail below, the image decoder 220 receives an original image from the memory 230, identifies blocks included in the original image that are capable of being independently decoded, generates an output image by pre-scaling each of the identified blocks on the basis of a size of a display image, and stores the generated output image in the memory 230. The display image denotes an image to be displayed.

The image decoder 220 may, for example, be physically implemented by an integrated circuit which is configured to execute the decoding/conversion process described herein. Further, the application processor 210 and image decoder 220 may be combined into a single integrated circuit.

The display device 240 displays a final output image stored in the memory 230. The display device 240 may, for example, be an LCD device or the like. The memory 230 may, for example, be constituted of volatile and/or non-volatile semiconductor memory.

Hereinafter, operations executed by the image decoder 220 according to example embodiments of the present invention will be described with reference to FIGS. 3 and 4.

Figure 3:
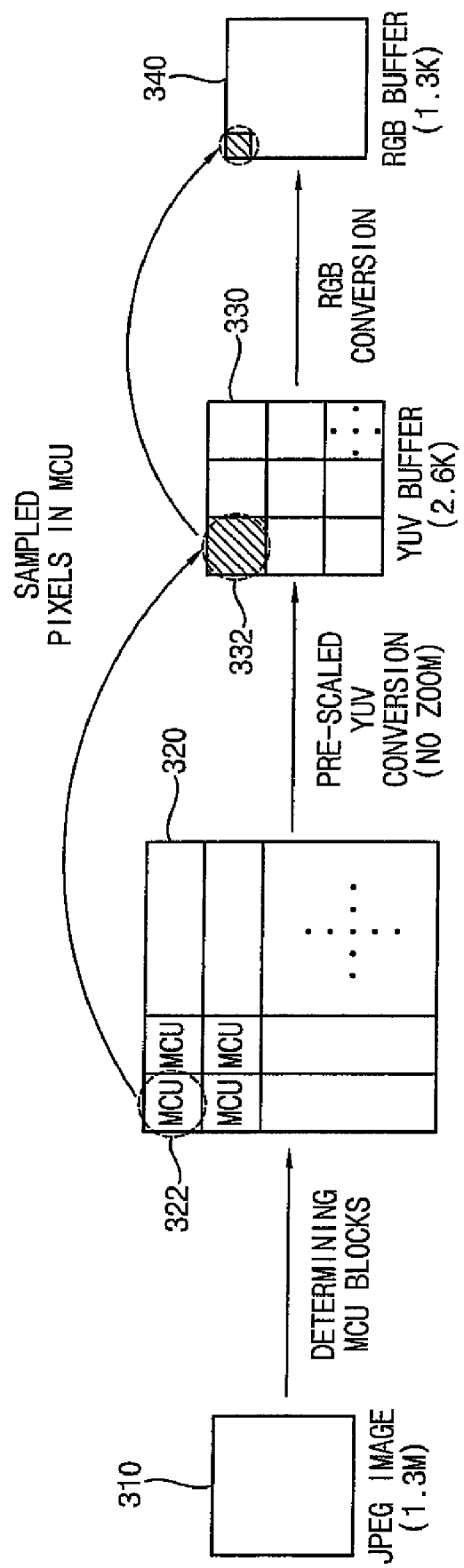
FIG. 3 is a diagram for use in describing a process executed by an image decoder of FIG. 2 in accordance with an example embodiment of the present invention.

FIG. 3 is a diagram for use in describing a process executed by the image decoder 220 of FIG. 2 to generate an output image compatible with a screen size of display device 240 according to an example embodiment of the present invention.

Referring collectively to FIGS. 2 and 3, the image decoder 220 identifies blocks 322 included in the original image 310 that are capable of being independently decoded.

The image decoder 220 may identify the independently decodable blocks 322 by decoding image information included in the original image 310. For example, when the original image 310 corresponds to a Joint Picture Expert Group (JPEG) image, each of the blocks capable of being independently decoded correspond to a minimum coded unit (MCU) included in the original JPEG image 310. The image decoder 220 determines, as the blocks 322, each of the MCU's included in the JPEG image 310. In the example of FIG. 3, the original image 310 is a 1.3 Mb JPEG image.

Next, as shown in FIG. 3, the image decoder 220 executes a pre-scaling YUV conversion operation with respect to each of the identified blocks 322 on the basis of a size of the display image, i.e., the image to be displayed. To execute this operation, the image decoder 220 utilizes a pre-scaling factor which corresponds to a value that is obtained by dividing the size of the display image by the size of the original image 310. For example, the size of the display image may correspond to the size of the image display screen of the display device 240.

The image decoder 220 samples pixels from each of the identified blocks 322 on the basis of the pre-scaling factor, and colligates the pixels into YUV blocks 332 which form a YUV image 330.

The YUV image 330, which may be stored in a YUV buffer, is expressed with information denoting a luminance signal Y, a difference U between the luminance signal Y and a red component R, and a difference V between the luminance signal Y and a blue component B. The YUV image may, for example, be classified into a 4:2:2 format or a 4:2:0 format according to a sampling ratio. In the example of FIG. 3, the YUV buffer holds 2.6 Kb of the YUV image 330.

Next, the image decoder 220 converts the YUV image 330 into an RGB image 340 which may be stored in an RGB buffer. In the example of FIG. 3, the RGB buffer holds 1.3 Kb of the RGB image 340. Generally, the data size of the YUV image 330 is about two times larger than the data size of the RGB image 340. However, a scaling procedure (i.e. enlargement or reduction) may be executed when the YUV image 330 is converted into the RGB image 340, and thus, the data size of the YUV image 330 is not necessarily related to the data size of the converted RGB image 340 by a fixed amount.

As described above in connection with the example embodiment of FIG. 3, by pre-scaling the independently decodable blocks of the original image, less memory resources are required in the overall decoding process.

Figure 4:
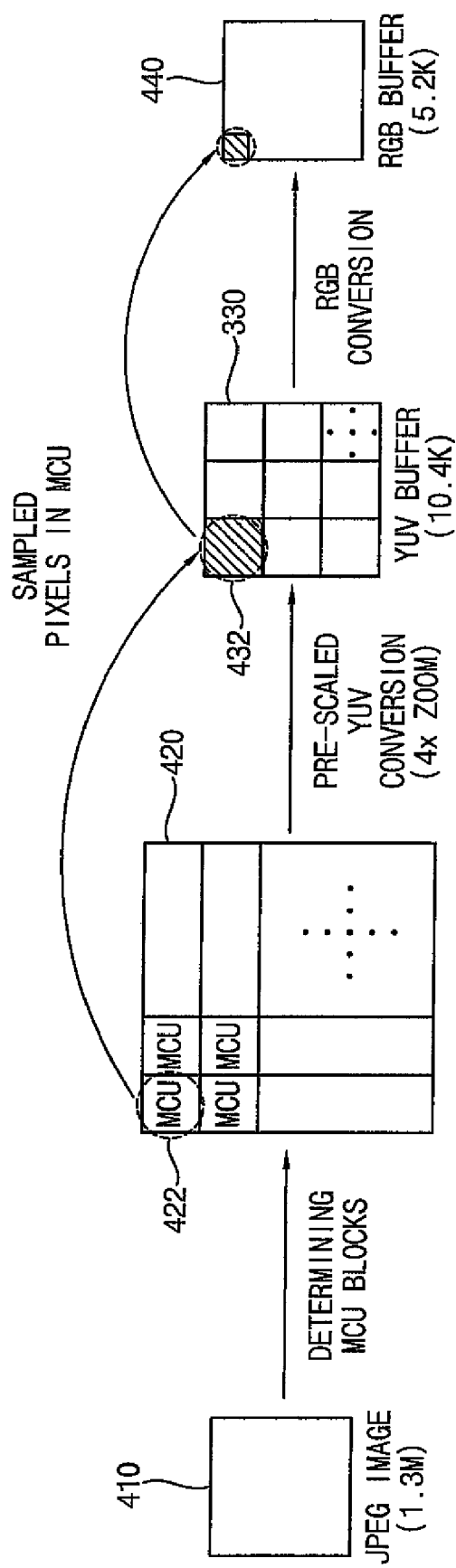
FIG. 4 is a diagram for use in describing a process executed an image decoder of FIG. 2 in accordance with another example embodiment of the present invention.

FIG. 4 is a diagram for use in describing a process in which the image decoder of FIG. 2 generates an output image according to a zoom setting of the display device. In the example of FIG. 4, the zoom setting is set to enlarge (4×) the image. However, the zoom setting can also be set to "no zoom" as in FIG. 3, or to reduce the image (i.e., fractional or negative zoom).

Referring collectively to FIGS. 2 and 4, the image decoder 220 identifies blocks 422 included in the original image 410 that are capable of being independently decoded.

The image decoder 220 may identify the independently decodable blocks 422 by decoding image information included in the original image 410. For example, when the original image 410 corresponds to a Joint Picture Expert Group (JPEG) image, each of the blocks capable of being independently decoded correspond to a minimum coded unit (MCU) included in the original JPEG image 410. The image decoder 220 determines, as the blocks 422, each of the MCU's included in the JPEG image 410. In the example of FIG. 4, the original image 410 is a 1.3 Mb JPEG image.

Next, as shown in FIG. 4, the image decoder 220 executes a pre-scaling YUV conversion operation with respect to each of the identified blocks 422 on the basis of the zoom setting and a size of the display image, i.e., the image to be displayed. To execute this operation, the image decoder 220 utilizes a pre-scaling factor which corresponds to (a) a zoom setting, and (b) a value that is obtained by dividing the size of the display image by the size of the original image 410. For example, the size of the display image may correspond to the size of the image display screen of the display device 240.

The image decoder 220 samples pixels from each of the identified blocks 422 on the basis of the pre-scaling factor, and colligates the pixels into YUV blocks 432 which form a YUV image 430.

The YUV image 430, which may be stored in a YUV buffer, is expressed with information denoting a luminance signal Y, a difference U between the luminance signal Y and a red component R, and a difference V between the luminance signal Y and a blue component B. The YUV image may be classified into a 4:2:2 format or a 4:2:0 format according to a sampling ratio. In the example of FIG. 4, the zoom setting is 4×, and the YUV buffer holds 10.4 Kb of the YUV image 430.

Next, the image decoder 220 converts the YUV image 430 into an RGB image 440 which may be stored in an RGB buffer. In the example of FIG. 4, the RGB buffer holds 5.2 Kb of the RGB image 440. Generally, the data size of the YUV image 430 is about two times larger than the data size of the RGB image 440. However, a scaling procedure (i.e. enlargement or reduction) may be executed when the YUV image 430 is converted into the RGB image 440, and thus, the data size of the YUV image 430 is not necessarily related to the data size of the converted RGB image 440 by a fixed amount.

As described above in connection with the example embodiment of FIG. 4, by pre-scaling the independently decodable blocks of the original image, less memory resources are required in the overall decoding process.

As described above, example embodiments of the present invention allow for a reduction in the amount of memory needed for decoding an image. This can result in a number of benefits, including a reduction in power consumption.

While the example embodiments of the present invention and their advantages have been described in detail, it should be understood that various changes, substitutions and alterations may be made herein without departing from the scope of the invention.

What is claimed is:

1. An image decoder, comprising:
   means for identifying blocks of an original image which are capable of being independently decoded; and
   means for generating an output image by pre-scaling each of the identified blocks on the basis of a size of a display image,
   wherein the means for generating the output image determines a pre-scaling factor in accordance with a ratio between the size of the display image and a size of the original image.

2. The image decoder of claim 1, wherein the means for identifying blocks decodes image information included in the original image to identify the blocks.

3. The image decoder of claim 1, wherein the means for generating the output image further samples pixels from each of the identified blocks on the basis of the pre-scaling factor to generate the output image.

4. The image decoder of claim 1, wherein the means for generating the output image adjusts the pre-scaling factor in accordance with an image zoom setting.

5. The image decoder of claim 1, wherein the original image corresponds to a JPEG image, and wherein each of the blocks capable of being independently decoded corresponds to a minimum coded unit included in the JPEG image.

6. The image decoder of claim 5, wherein the means for generating the output image samples pixels from the minimum coded unit on the basis of the pre-scaling factor.

7. The image decoder of claim 6, wherein the means for generating the output image colligates the sampled pixels, and generates an image capable of being displayed by a display device on the basis of the colligated pixels.

8. The image decoder of claim 7, wherein the means for generating the output image generates a YUV image on the basis of the colligated pixels, and converts the generated YUV image into a RGB image.

9. The image decoder of claim 5, wherein, when the size of the display image is reduced or enlarged, the image decoder adjusts the pre-scaling factor so as to correspond to a ratio between the reduced or enlarged size of the display image and the size of the original image.

10. A mobile device, comprising:
    a memory configured to store an original image and an output image;
    a display device configured to display the output image; and
    an image decoder configured to receive the original image from the memory, to identify blocks included in the original image that are capable of being independently decoded, to generate the output image by pre-scaling each of the identified blocks on the basis of a size of a display image, and to store the generated output image in the memory,
    wherein the image decoder determines a pre-scaling factor which corresponds to a ratio between the size of the display image and a size of the original image.

11. The mobile device of claim 10, further comprising an application processor configured to control the image decoder, the memory, and the display device.

12. The mobile device of claim 10, wherein the image decoder decodes image information included in the original image to identify the blocks.

13. The mobile device of claim 10, wherein the image decoder samples pixels from each of the identified blocks on the basis of the pre-scaling factor.

14. The mobile device of claim 10, wherein, when the size of the display image is reduced or enlarged, the image decoder adjusts the pre-scaling factor so as to correspond to a ratio between the reduced or enlarged size of the display image and the size of the original image.

15. The mobile device of claim 10, wherein the original image corresponds to a JPEG image, and wherein each of the blocks capable of being independently decoded corresponds to a minimum coded unit included in the JPEG image.

16. The mobile device of claim 15, wherein the image decoder samples pixels from the minimum coded unit on the basis of the pre-scaling factor.

17. The mobile device of claim 16, wherein the image decoder colligates the sampled pixels, and generates an image capable of being displayed by a display device on the basis of the colligated pixels.

18. The mobile device of claim 17, wherein the image decoder generates a YUV image on the basis of the colligated pixels, and converts the generated YUV image into an RGB image.

19. The mobile device of claim 15, wherein, when the size of the display image is reduced or enlarged, the image decoder adjusts the pre-scaling factor so as to correspond to a ratio between the reduced or enlarged size of the display image and the size of the original image.

* * * * *